United States Patent [19]

Suzuki

[11] Patent Number: 6,146,546
[45] Date of Patent: Nov. 14, 2000

[54] FREEZABLE COOLANT COMPOSITION

[75] Inventor: Rokuro Suzuki, 1371-1, Hase, Atsugi-shi, Kanagawa-ken, Japan

[73] Assignees: **S*I*C Co., Ltd, Yokohama; Rokuro Suzuki**, Aitsugi, both of Japan

[21] Appl. No.: 09/541,628

[22] Filed: Apr. 3, 2000

[30] Foreign Application Priority Data

Feb. 7, 2000 [JP] Japan ................ 2000-029258

[51] Int. Cl.[7] ................ C09K 5/10; C09K 5/00
[52] U.S. Cl. ................ 252/76; 252/71; 252/73; 252/74; 252/79
[58] Field of Search ................ 252/71, 73, 74, 252/76, 79

[56] References Cited

U.S. PATENT DOCUMENTS

| | | | |
|---|---|---|---|
| 4,798,173 | 1/1989 | Wilgren | 119/61 |
| 5,718,836 | 2/1998 | Nakatani et al. | 252/74 |
| 5,758,513 | 6/1998 | Smith | 62/457.5 |
| 5,843,466 | 12/1998 | Mane et al. | 424/401 |
| 6,067,813 | 5/2000 | Smith | 62/371 |

FOREIGN PATENT DOCUMENTS 62-62192  3/1987  Japan .

*Primary Examiner*—Anthony Green
*Attorney, Agent, or Firm*—Dougherty & Troxell

[57] ABSTRACT

Disclosed is a freezable coolant composition used for cold-preservation of, e.g., foods by utilizing the latent heat of fusion at the freezing point which is substantially higher than 0° C. and in the range, for example, from 5° C. to 26° C. The composition is a ternary mixture consisting of: (A) from 98.0 to 8.0% by weight of 1,6-hexanediol; (B) from 0.5 to 3.0% by weight of sodium benzoate; and (C) from 1.5 to 89.0% by weight of water, each percentage being based on the total amount of the components (A), (B) and (C).

2 Claims, 8 Drawing Sheets

FREEZABLE COOLANT COMPOSITION

BACKGROUND OF THE INVENTION

The present invention relates to a freezable coolant composition or, more particularly, to an inexpensive but efficient freezable coolant composition having a freezing point substantially higher than 0° C. reaching around room temperature and capable of exhibiting a great cooling capacity by virtue of a relatively large latent heat of fusion and a relatively large specific heat to be useful, for example, as a coolant in an air conditioner using "an economical ice".

As is known, a great variety of cooling or chilling agents are employed heretofore for keeping a material at a relatively low temperature for a duration with an object of, for example, freshness preservation of foods and so on depending on the nature of the material to be kept at the low temperature or the temperature at which the material is to be kept.

The cooling agents under current use can be classified into two types depending on the working principle of the cooling agent including those of the latent-heat type such as ice and certain organic compounds melting at the cooling temperature and those of the sensible-heat type such as certain metals and inorganic compounds utilizing mere heat absorption without any phase changes.

As compared with the sensible-heat type cooling agents working within a temperature range involving no phase change of the substance, the cooling agents of the latent-heat type in general working within a temperature range involving the solid-liquid phase change of the substance exhibit a large cooling capacity by virtue of utilization of the latent heat of fusion which is usually greater than the specific heat of the same substance so that a large cold-keeping effect can be obtained with a relatively small amount of the latent-heat type cooling agent. The temperature range in which a latent-heat type cooling agent works can be narrow enough for the large cooling capacity so that the thermal loss with the ambience can be minimized as a great advantage. Japanese Patent Kokai 62-62192 proposes specific halogenated hydrocarbon compounds, alcoholic compounds having 2 to 10 carbon atoms in a molecule, ketone compounds and ether compounds as well as aqueous solutions of inorganic salts as a latent-heat type cooling agent.

Even by setting aside the ice/water system as a matter of course, the freezing temperature range of most of the latent-heat type cooling agents in the prior art is at or in the vicinity of 0° C. so that they are not suitable as a refrigerant in an air conditioner. When a cooling temperature substantially higher than 0° C. is desired as an optimum storage temperature for certain foods, for example, no latent-heat type cooling agent working within such a temperature range is available in the prior art. Other problems in the conventional latent-heat type cooling agents or coolant compositions in general include their not so large latent heat of fusion and specific heat as not to ensure a desirable large cooling capacity, long-term stability to withstand deterioration and safety from the risk of environmental pollution. The sensible-heat type cooling agents are, as is mentioned above, generally not comparable with the latent-heat type cooling agents in respect of the small specific heat not to exhibit a large cooling capacity.

SUMMARY OF THE INVENTION

The present invention accordingly has an object, in view of the above described problems and disadvantages in the prior art cooling agents of, in particular, the latent-heat type or freezable coolants, to provide a novel latent-heat type freezable coolant composition capable of exhibiting a large cooling capacity within a temperature range involving the freezing point or, namely, the temperature of a solid-liquid phase change of the composition which is substantially higher than −10° C. or, preferably, than 0° C., for example, in the range from 5° C. to 26° C.

Thus, the latent-heat type freezable coolant composition provided by the present invention is a uniform mixture consisting essentially of:

(A) from 98.0 to 8.0% by weight of 1,6-hexanediol;

(B) from 0.5 to 3.0% by weight of sodium benzoate; and (C) from 1.5 to 89.0% by weight of water, each percentage being based on the total amount of the components (A), (B) and (C).

DETAILED DESCRIPTION OF THE PREFERRED EMBODIMENTS

As is described above, the coolant composition of the present invention is essentially a ternary mixture consisting of (A) 1,6-hexanediol, (B) sodium benzoate and (C) water in a specified weight proportion. The freezing point of the coolant composition as well as the latent heat of fusion and specific heat of the mixture naturally depend on the mixing proportion of the three components and the mixing proportion of the three components should be adequately selected so that the composition may have a freezing point within a desired temperature range of, for example, 5° C. to 26° C.

The above mentioned range of the freezing point of the coolant composition can be obtained by a mixture consisting of:

(A) from 98.0 to 8.0% by weight or, preferably, from 90.0 to 60.0% by weight of 1,6-hexanediol;

(B) from 0.5 to 3.0% by weight or, preferably, from 0.5 to 2.0% by weight of sodium benzoate; and (C) from 1.5 to 89.0% by weight or, preferably, from 9.5 to 38.0% by weight of water, each percentage being based on the total amount of the components (A), (B) and (C).

The freezable coolant composition of the invention consisting of the three components in the above specified mixing proportion has a specific heat in the range from about 5.1 to 9.8 kJ/kg.° C. depending on the mixing proportion as determined by a differential scanning calorimeter such as Model DSC-30, TA-3000 (manufactured by Metler Co.). Further, the latent heat of fusion of the composition is in the range from about 199.9 to 319.2 J/g as determined by using a differential scanning calorimeter such as Model SEIKO-SSC/5200H (manufactured by Seiko Instrument Co.).

Figure 1:
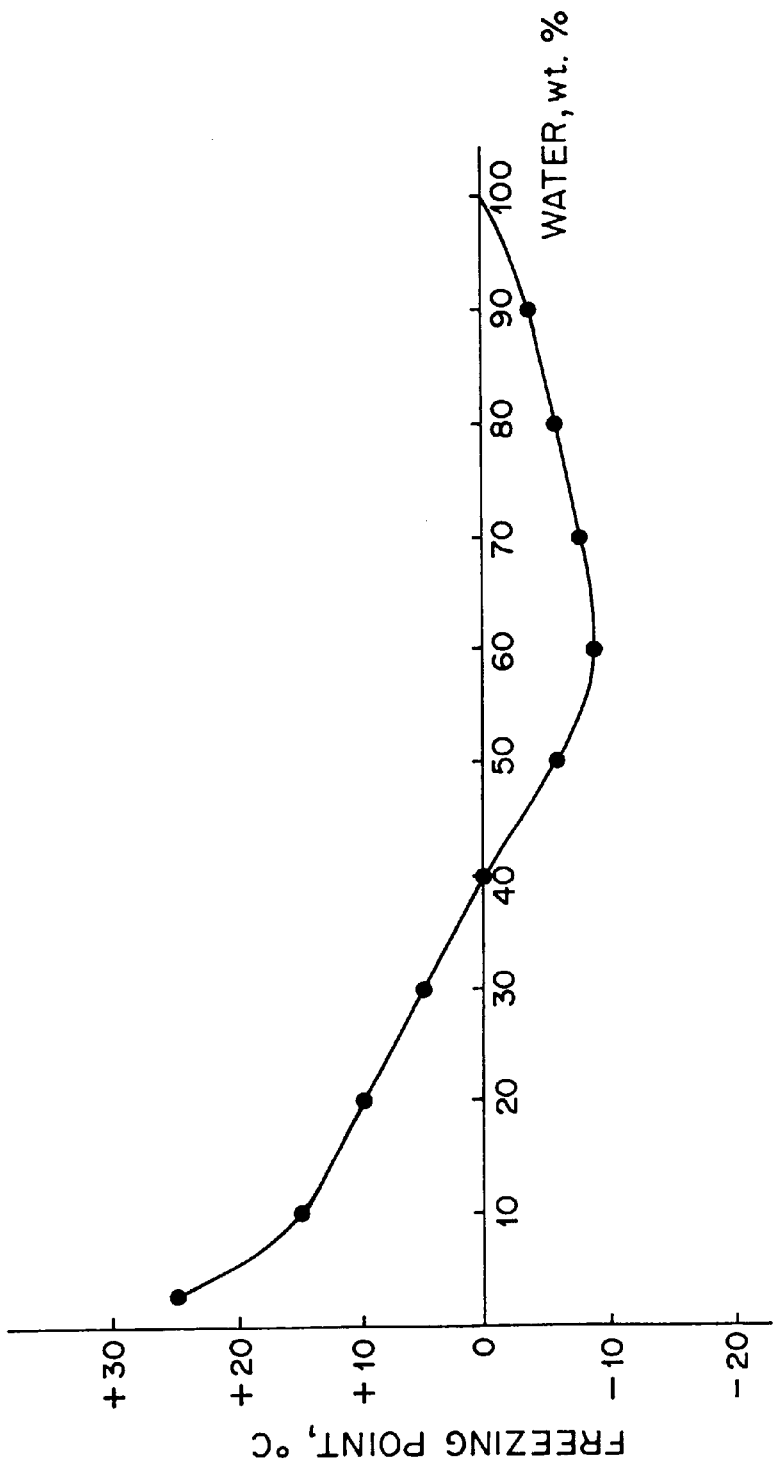
FIG. 1 is a graph showing the freezing temperature of a binary mixture of 1,6-hexanediol and water as a function of the content of water.

FIG. 1 of the accompanying drawing is a graph showing the freezing point of a binary mixture consisting of 1,6-hexanediol and water as a function of the content of water in the mixture. A freezing point of 5° C. of the composition is obtained when the composition is formulated with 70% by weight of 1,6-hexanediol, 1 to 2% by weight of sodium benzoate and 29 to 28% by weight of water. A freezing point of 10° C. of the composition is obtained when the composition is formulated with 80% by weight of 1,6-hexanediol, 1 to 2% by weight of sodium benzoate and 19 to 18% by weight of water.

Sodium benzoate as the component (B), which is contained in the inventive coolant composition in an amount of 0.5 to 3.0% by weight, has an effect of increasing the freezing temperature of the coolant composition and also works as a corrosion inhibitor.

It is preferable that the inventive coolant composition is prepared by using purified water for the component (C) in order to obtain durability or stability over a long period of time.

It is optional that the freezable coolant composition of the invention, of which the essential ingredients are the components (A), (B) and (C), is admixed according to need with known additives including stabilizers, anti-corrosion agents, coloring agents and the like each in a limited amount.

The coolant composition of the present invention can be prepared by merely mixing the components (A), (B) and (C) each in a specified amount to give a uniform mixture. In an actual procedure, it is advantageous that sodium benzoate as the component (B) is first dissolved in water as the component (C) to give a uniform aqueous solution of sodium benzoate into which liquid 1,6-hexanediol prepared in advance by heating the solidified compound having a melting point of about 43° C. is added as the component (A) under agitation with a suitable stirrer. It is important in this case that entrainment of air into the mixture under agitation is minimized in order to avoid increase of the dissolved oxygen therein by adequately selecting the types of the stirrer blades and the velocity of stirrer revolution.

In the following, the freezable coolant composition of the present invention is described in more detail by way of examples, which, however, never limit the scope of the invention in any way.

Preparation of coolant compositions 1 to 4

(1) Coolant composition 1 of the invention having a freezing point of about 5° C. was prepared in the above described manner from 70% by weight of 1,6-hexanediol, 2% by weight of sodium benzoate and 28% by weight of purified water.

(2) Coolant composition 2 of the invention having a freezing point of about 10° C. was prepared in the above described manner from 80% by weight of 1,6-hexanediol, 2% by weight of sodium benzoate and 18% by weight of purified water.

(3) Coolant composition 3 of the invention having a freezing point of about 25° C. was prepared in the above described manner from 95% by weight of 1,6-hexanediol, 2% by weight of sodium benzoate and 3% by weight of purified water.

(4) Coolant composition 4 for comparative purpose having a freezing point of about 4° C. was prepared according to the disclosure in Japanese Patent Kokai 9-255943 by blending 97.3% by weight of 1,4-butanediol and 2.7% by weight of a polyethyleneglycol (Polyethyl-eneglycol 20000, a product by Wako Pure Chemical Co.).

Evaluation of Coolant Compositions (1) Specific Heat

Measurements of the specific heat were conducted for the coolant compositions 1 and 2 prepared above by using a differential scanning calorimeter (Model DSC-30, TA-3000, manufactured by Metler Co.). The results were that the coolant compositions 1 and 2 had a specific heat of 7.43 kJ/kg.° C. and 8.21 kJ/kg.° C., respectively.

(2) Latent Heat of Fusion

Measurements of the latent heat of fusion were conducted for the coolant compositions 1 and 2 prepared above by using a differential scanning calorimeter (Model SEIKO-SSC/5200H, manufactured by Seiko Instrument Co.). The results were that the coolant compositions 1 and 2 had a latent heat of fusion of 227.6 J/g and 218.4 J/g, respectively.

(3) Cold-Keeping Test

A heat-insulation box having inside dimensions of 22 cm by 60 cm by 18 cm was builtd from foamed polystyrene boards of 2 cm thickness. Two milk bottles of glass each having an outer diameter of 5 cm and filled with 180 ml of cow's milk at 10° C. were put into the heat-insulation box on the 22 cm by 18 cm bottom surface together with 400 ml of the coolant composition 1 at 6° C. contained in a container of 10 cm by 10 cm wide and 4 cm deep in the inner dimensions made of a 1 mm thick polyvinyl chloride resin plate put between the two milk bottles in the box. Each of the milk bottles was kept 1 cm apart from the coolant container. The temperature of the milk in the bottle was continuously measured at an ambient temperature of 20° C. by using a thermocouple thermometer with the measuring point of the thermocouple inserted into the half depth of the milk in one of the milk bottles. The results are shown in FIG. 2 by the curve I.

The same experimental procedure as above was repeated for the coolant composition 2 except that the initial temperature of the cow's milk in the milk bottles was 15° C. instead of 10° C. and the temperature of the coolant composition 2 introduced into the heat-insulation box was 10° C.

Figure 2:
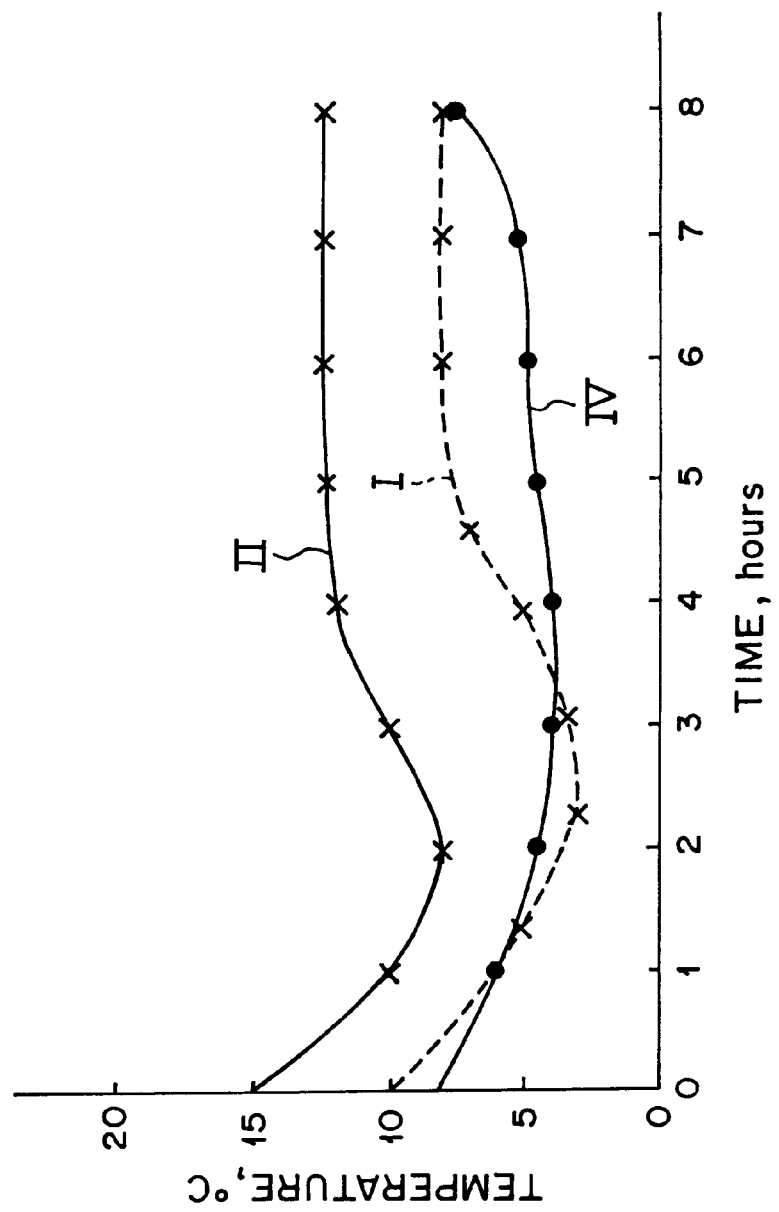
FIG. 2 is a graph showing the results of cold-keeping tests by the temperature change with coolant compositions including two inventive and one comparative compositions over hours.

The results of the measurement for the coolant composition 2 are shown in FIG. 2 by the curve II.

The same experimental procedure as above was further repeated for the comparative coolant composition 4 except that the initial temperature of the cow's milk in the milk bottles was 8° C. instead of 10° C. and the temperature of the coolant composition 4 introduced into the heat-insulation box was 6° C.

The results of the measurement for the coolant composition 4 are shown in FIG. 2 by the curve IV.

As is understood from FIG. 2, the coolant compositions 1 and 2 of the invention served to maintain the respective cooling temperature for a length of up to 8 hours while the duration with the comparative coolant composition 4 was about 4 hours after which the temperature was gradually increased.

(4) Freezing Test

Each a 100 ml portion of the coolant compositions 1, 2 and 3 heated at 50° C. was transferred under an ambience kept at 0° C. and the decreasing temperature of each coolant composition was continuously measured by using a thermocouple thermometer over a period of several thousands seconds.

Figure 3:
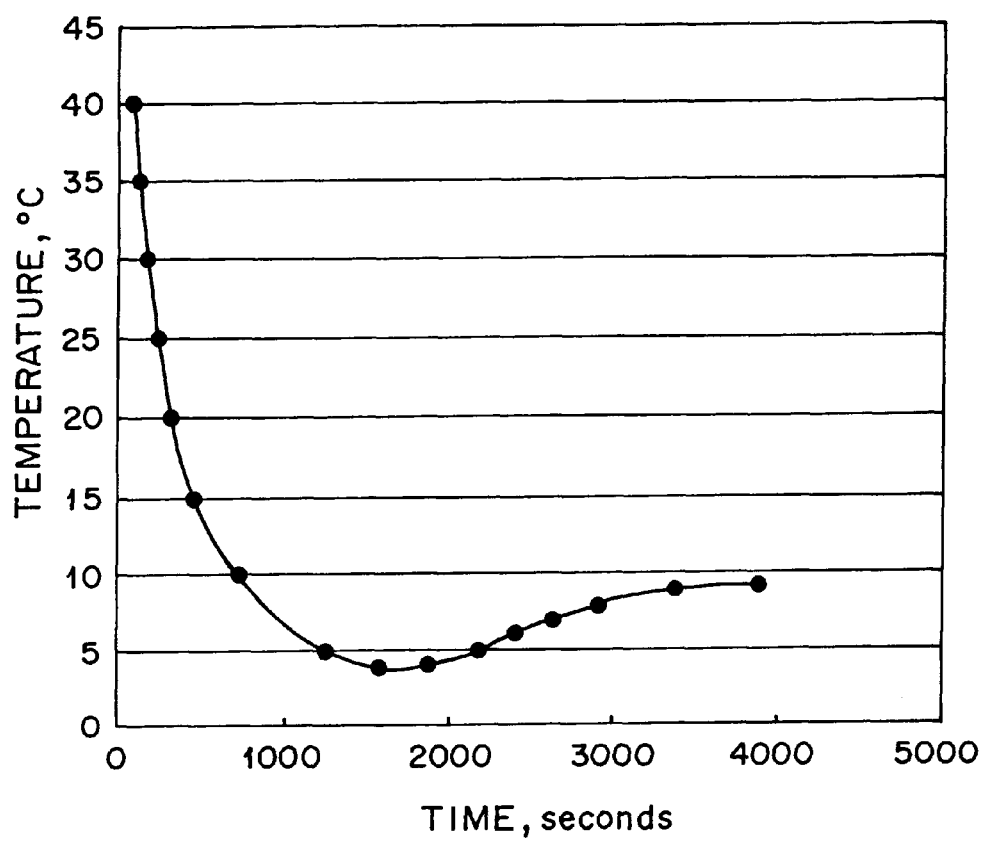
FIGS. 3, 4 and 5 are each a graph showing the result of the freezing test for different coolant compositions of the invention.
Figure 4:
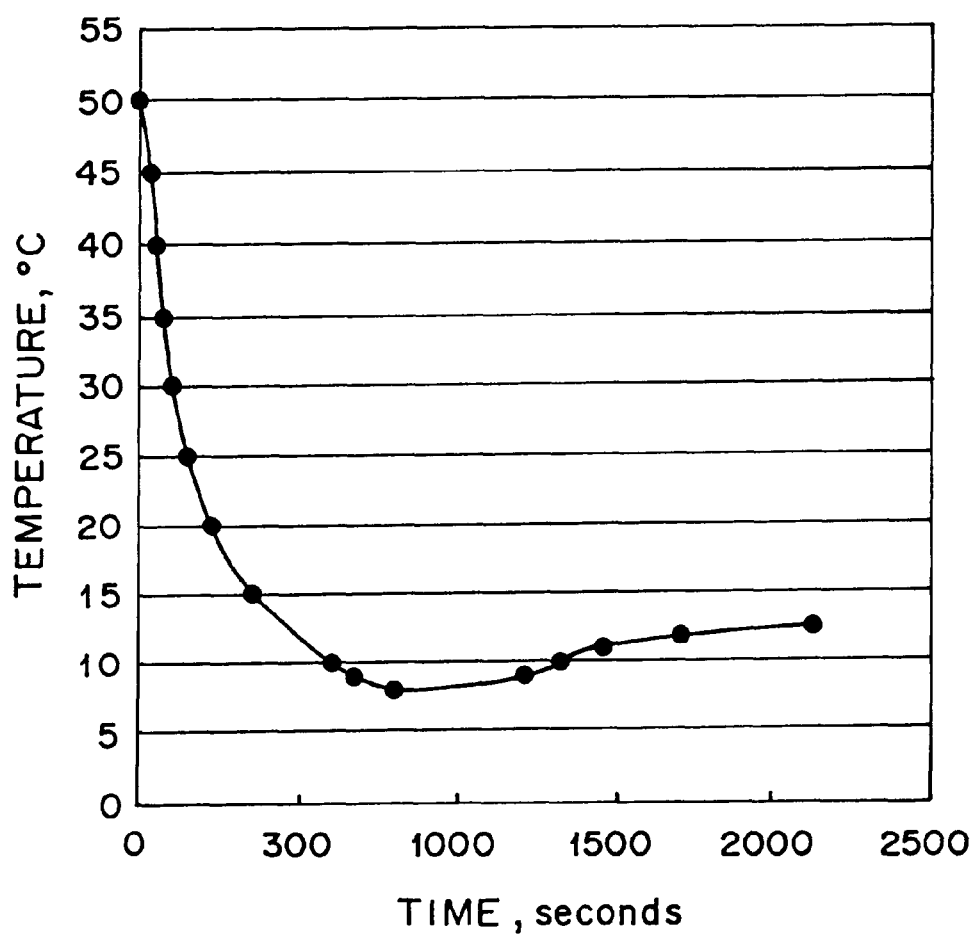
Figure 5:
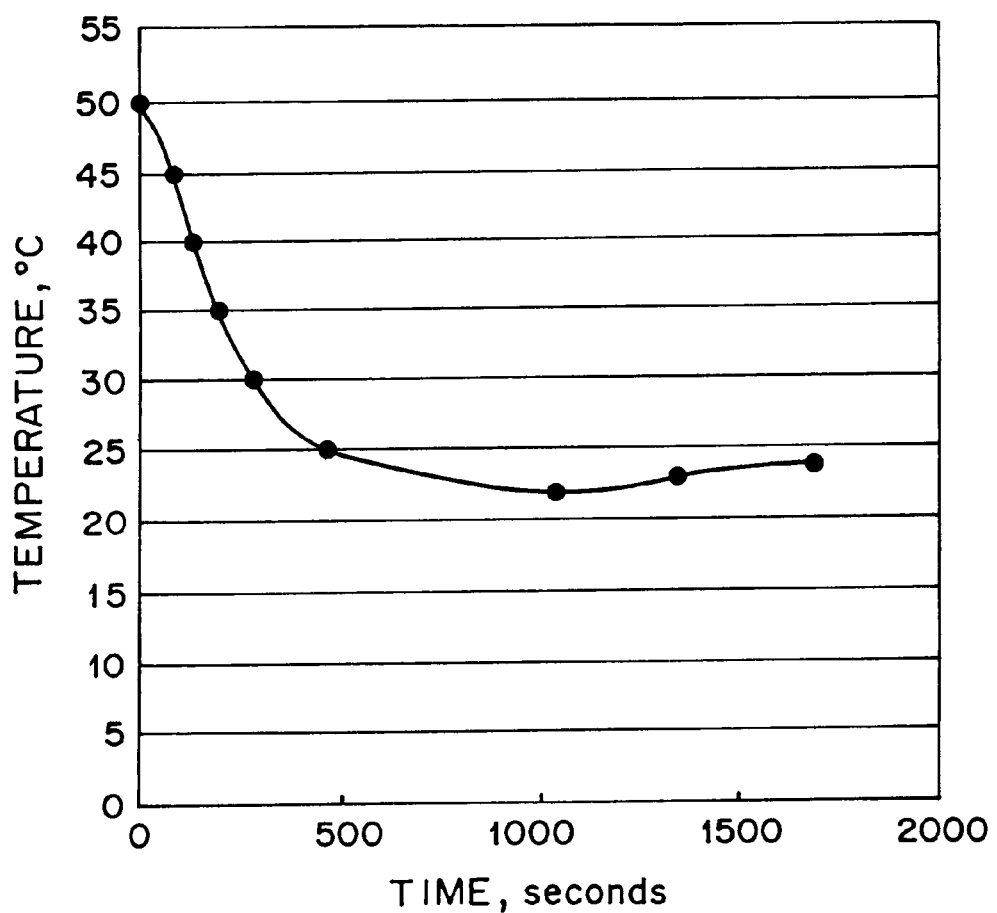

The results obtained for the coolant compositions 1, 2 and 3 are graphically shown in FIGS. 3, 4 and 5, respectively. As is understood from these graphs, the times taken for the coolant compositions 1, 2 and 3 to reach the freezing point thereof were 1239 seconds, 587 seconds and 455 seconds, respectively, being shorter as the freezing point was higher.

(5) Heating Test

Each a 100 ml portion of the coolant compositions 1, 2 and 3 as frozen by chilling at about 0° C. was transferred under an ambience at 100° C. and the increasing temperature of the coolant composition was continuously measured by using a thermocouple thermometer.

Figure 6:
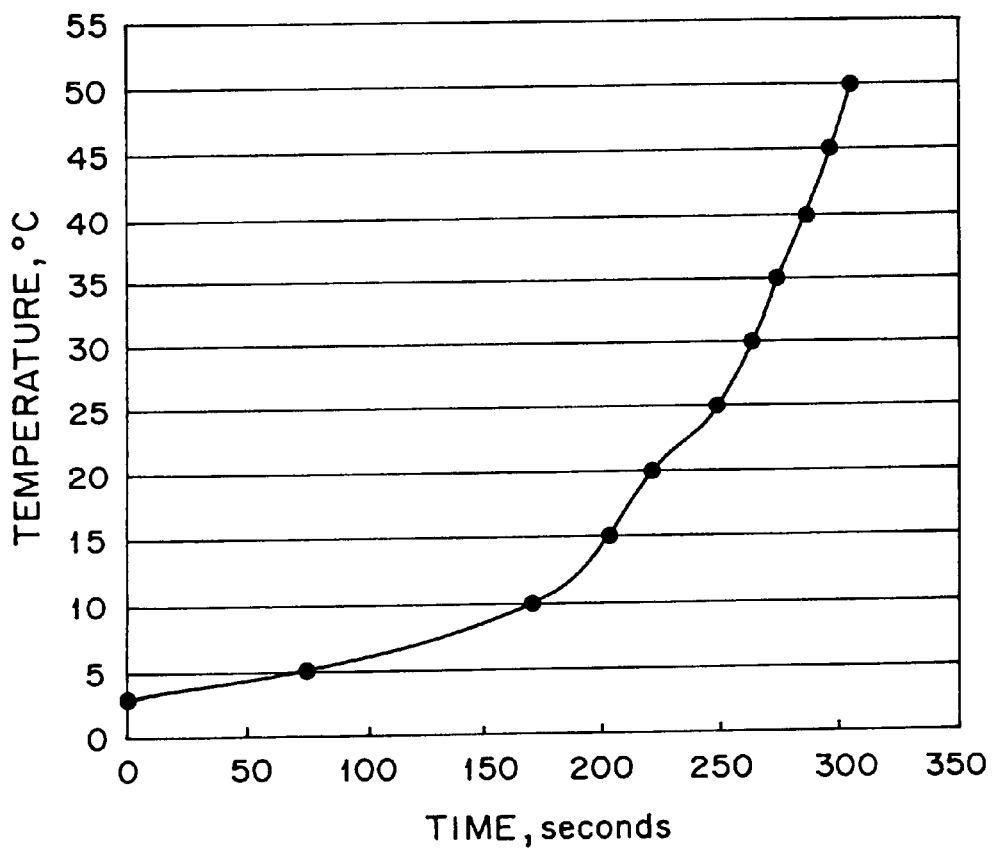
FIGS. 6, 7 and 8 are each a graph showing the result of the heating test for different coolant compositions of the invention.
Figure 7:
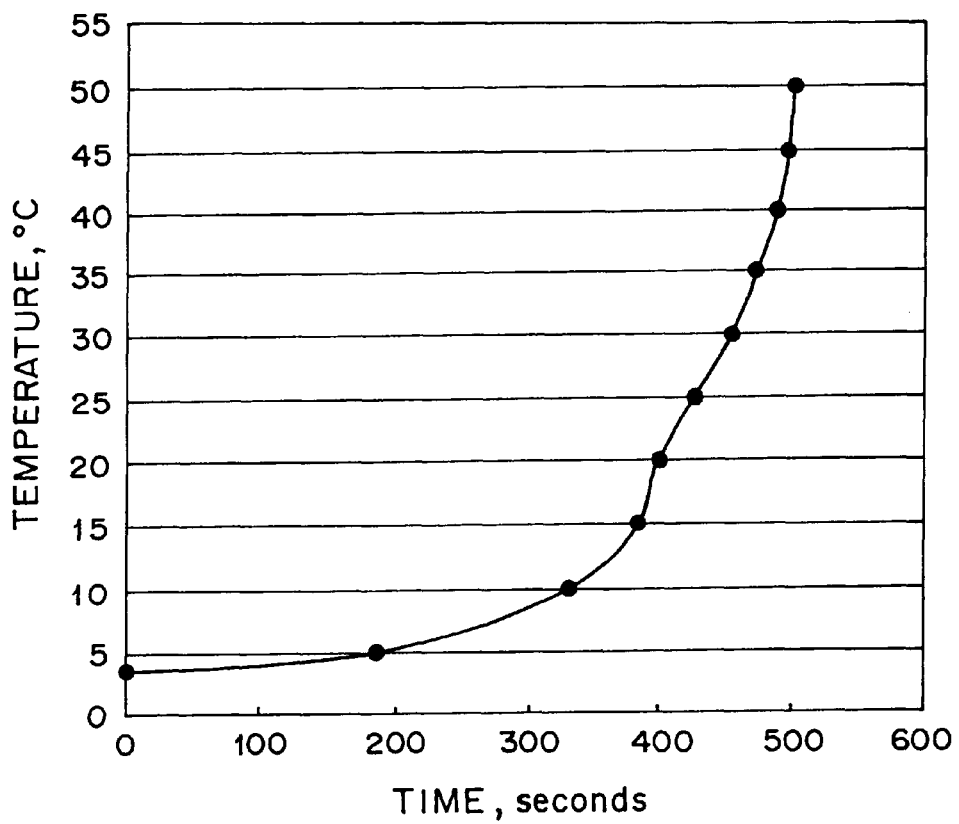
Figure 8:
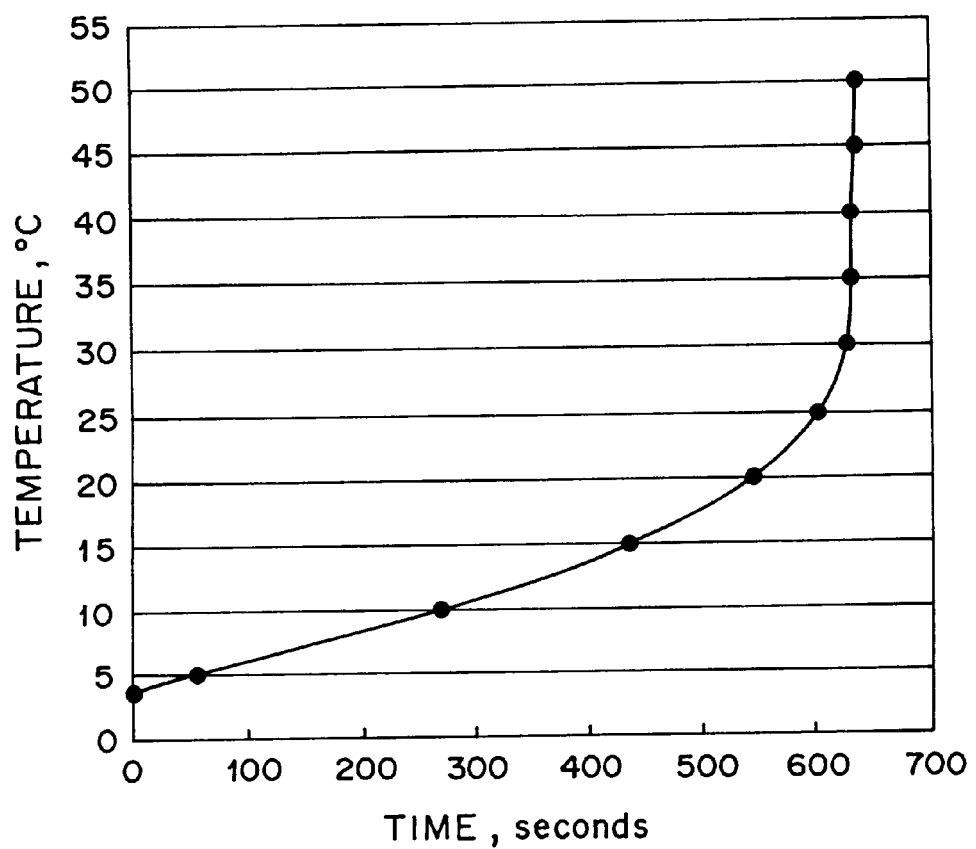

The results obtained for the coolant compositions 1, 2 and 3 are graphically shown in FIGS. 6, 7 and 8, respectively. As is understood from these graphs, the durations of time during which the temperature of the coolant composition was kept lower than the freezing point thereof for the coolant compositions 1, 2 and 3 were 75 seconds, 331 seconds and 271 seconds, respectively, being longer as the freezing point was higher.

What is claimed is:

1. A freezable coolant composition which is a uniform mixture consisting essentially of:

(A) from 98.0 to 8.0% by weight of 1,6-hexanediol;

(B) from 0.5 to 3.0% by weight of sodium benzoate; and (C) from 1.5 to 89.0% by weight of water, each percentage being based on the total amount of the components (A), (B) and (C).

2. The freezable coolant composition as claimed in claim 1 which consists essentially of:

(A) from 90.0 to 60.0% by weight of 1,6-hexanediol;

(B) from 0.5 to 2.0% by weight of sodium benzoate; and (C) from 9.5 to 38.0% by weight of water, each percentage being based on the total amount of the components (A), (B) and (C).

* * * * *